United States Patent
Fuglsang-Petersen et al.

(10) Patent No.: US 8,753,082 B2
(45) Date of Patent: Jun. 17, 2014

(54) GEAR BOX OF A WIND POWER PLANT

(75) Inventors: Jochen Fuglsang-Petersen, Heide (DE); Jan-Bernd Franke, Hamburg (DE)

(73) Assignee: Senvion SE, Hamburg (DE)

( * ) Notice: Subject to any disclaimer, the term of this patent is extended or adjusted under 35 U.S.C. 154(b) by 1006 days.

(21) Appl. No.: 12/830,677

(22) Filed: Jul. 6, 2010

(65) Prior Publication Data
US 2011/0008168 A1    Jan. 13, 2011

(30) Foreign Application Priority Data
Jul. 9, 2009  (DE) .......................... 10 2009 032 667

(51) Int. Cl.
*F03D 11/00* (2006.01)
*F16H 57/02* (2012.01)
*G01M 13/02* (2006.01)

(52) U.S. Cl.
USPC ...... 416/61; 416/170 R; 73/112.01; 73/865.8; 356/241.6; 475/302; 475/343

(58) Field of Classification Search
USPC ............... 415/118, 122.1; 416/61, 170 R; 73/112.01, 865.8; 356/241.1, 356/241.3–241.6; 74/606 R, 608, 609; 475/5, 149, 302, 343
See application file for complete search history.

(56) References Cited

U.S. PATENT DOCUMENTS

| | | | |
|---|---|---|---|
| 3,778,170 A | * | 12/1973 | Howell et al. .............. 356/241.4 |
| 3,884,098 A | | 5/1975 | Gumpoltsberger |
| 4,300,774 A | * | 11/1981 | Hollis et al. .................. 277/630 |
| 2007/0107504 A1 | * | 5/2007 | Smed et al. ..................... 73/116 |

FOREIGN PATENT DOCUMENTS

| | | |
|---|---|---|
| DE | 103 34 448 B4 | 2/2005 |
| DE | 103 57 026 | 6/2005 |
| DE | 10 2007 037 542 | 2/2009 |
| DE | 102007037542 A1 | 2/2009 |

OTHER PUBLICATIONS

English Translation of DE 10 2007 037 542 from EPO website, Feb. 2009.*

* cited by examiner

*Primary Examiner* — Christopher Verdier
(74) *Attorney, Agent, or Firm* — Rankin, Hill & Clark LLP

(57) ABSTRACT

A multi-stage gear box (122) of a wind power plant, wherein the gear box (122) includes a gear box housing (125). The gear box (122) includes at least one access opening for the insertion of a work instrument into the gear box housing (125) or respectively into the interior of the gear box housing (125) is provided on the outside of the gear box housing (125) and in that at least one guiding device (201, 202, 203, 204, 205) is provided for the work instrument inside the gear box housing (125) so that the work instrument is moveable and/or positionable within the guiding device (201, 202, 203, 204, 205). Parts of the gear box (122) in the gear box housing (125) are checked and/or worked by a work instrument inserted or arranged or arrangeable in the guiding device (201, 202, 203, 204, 205).

10 Claims, 3 Drawing Sheets

GEAR BOX OF A WIND POWER PLANT

BACKGROUND OF THE INVENTION FIELD OF THE INVENTION

The invention relates to a gear box of a wind power plant, in particular a multi-stage gear box of a wind power plant, wherein the gear box comprises a gear box housing. Furthermore, the invention relates to a wind power plant and use of a work instrument.

DESCRIPTION OF RELATED ART

Wind power plants of the patent applicant are known under the description 5M, MM92, MM82, MM70 and MD77. The wind power plants can be erected both on the ground (onshore) or in bodies of water (offshore).

In the case of wind power plants, the rotors of the wind power plant are connected with a gear box and a generator via a drive train. The wind power plant hereby generally comprises a rotor shaft, on one end of which the rotor shaft is coupled with the rotor and on the other end of which the rotor shaft is coupled with the gearbox. The rotor blades of the wind power plant are fastened on a rotor hub, which is in turn connected with the rotor shaft. The rotational movement of the rotor is transferred to the gearbox via the rotor shaft so that the gearbox is in operative connection with a generator via a generator-side output.

In the case of generic wind power plants, the gear box can be multi-stage, wherein the gear box generally has one or more planetary stages and, if applicable, one or more gear box stages (spur wheel stages).

The first gear box stage of a multi-stage gear box for generic wind power plants is frequently designed as a planetary stage, wherein the rotor is coupled with the planet carrier or the hollow wheel of the planetary stage. The planetary stage hereby generally consists of a sun wheel, around which several planet gears meshing with the sun wheel are arranged, wherein the planet gears are mounted in a planet carrier. The sun wheel, the planet gears and the parts of the planet carrier are surrounded by a hollow wheel, wherein the hollow wheel is designed such that it meshes with the planet gears.

For example, DE-B-103 57 026 and DE-B-103 34 448 describe wind power plans with multi-stage gear boxes.

Based on this stage of the art, the object of the invention is to perform maintenance measures for a wind power plant in an, in particular multi-stage, gear box in a simple manner, wherein the time and construction effort should be kept as low as possible.

BRIEF SUMMARY OF THE INVENTION

This object is solved through a gear box of a wind power plant, in particular a multi-stage gear box of a wind power plant, wherein the gear box comprises a gear box housing, which is further developed in that at least one access opening is provided on the outside of the gear box housing for the insertion of a work instrument into the gear box housing or respectively into the interior of the gear box housing and in that at least one guiding means is provided for the work instrument inside the gear box housing so that the work instrument is movable and/or positionable within the guiding means, wherein in particular, parts of the gear box are checked or examined and/or worked by means of the work instrument inserted or arranged or arrangeable in the guiding means or at least one physical property of a medium, in particular of oil, in the gear box housing or physical properties of components of the gear box are detected or respectively are detectable.

The invention is based on the idea that in erected wind power plants the interior of a gear box, in particular a planetary gear box, can be examined, checked and/or worked, e.g. repaired, in a simple manner. For this, it is possible through the guiding means, e.g. a guide tube or empty tube, to insert a work instrument into the housing on a specific and defined guided track, wherein the work instrument can be a test device, a measurement device, a tool or a processing device so that the work instrument is positioned at predetermined locations or respectively on components in the gear box through an exact guidance of the work instrument in the guiding means, designed for example as a guide tube or hose in order to perform corresponding measures (examinations, inspections or if applicable repairs) with the work instrument. The corresponding work instruments are hereby arranged on the relevant components within the gear box, which are accessible based on the structural type.

For example, it is conceivable within the scope of the invention that the work instrument is designed as a heat sensor, e.g. infrared sensor or the like in order to capture or respectively detect the heat development on certain components of the gear box during the warm-up phase or operating phase or in the cool-down phase.

Through the guided positioning and precise guidance of the work instrument, using the empty guide tube or respectively empty tube, the work instrument is guided quickly and easily to the relevant components or spots inside the gear box housing since the work instrument is guided in a tubular manner through the guide tube during the insertion process. In this respect, it is no longer necessary to rely on the skill of the maintenance personnel and their sense of space to position the work instrument at the desired location within the gear box. In particular, positions that are difficult to access are reached quickly within the interior of the gear box due to the defined guidance of the work instrument through the empty tube.

A guide device for the work instrument is provided through the provided guide tube or respectively empty tube, which is arranged inside the gear box housing. Via the access opening provided on the outside of the gear box housing, the work instrument is inserted into the tube since the access opening and the inlet side of the guide tube work together or are arranged so that they communicate with each other.

It is thus possible, by means of the invention, to capture and document in a simple and fast manner the inner state of a gear box, for example through insertion of an endoscope into the guidance tube.

In a preferred embodiment, the guiding means for the work instrument in the gear box is constructed as a guide tube or respectively empty tube and/or as a guide hose. The guiding means for the work instrument is hereby designed or respectively installed at least in a tubular manner in sections and/or at least hose-like in sections inside the gear box housing. When discussing a guide tube within the scope of the invention, a guide hose is also included in the same manner. Furthermore, within the scope of the invention, a guiding means for the working instrument is a guide tube or a guide hose as well as a combination of the two guide devices into which the work instrument is inserted. The guide hose preferably has a predetermined elasticity so that the guide hose is bendable.

It is further provided for this that the cross-section of the guiding means, e.g. a guide tube, is constructed closed at least in sections so that the work instrument is hereby held within the tube during an insertion process into the guide tube or respectively empty tube in the longitudinal direction of the guide tube, whereby the interior of the guide tube is not freely accessible from outside in the sections and the work instrument, or respectively a section of the work instrument, is received within the close section. Within the scope of the invention, a guiding means with a closed cross-section is understood as a guide tube or hose so that the work instrument inserted into the guiding means during the insertion or respectively positioning process cannot deviate laterally or respectively transversely to the guide direction and remains arranged in the guide tube or hose.

Through the invention, no structural measures or changes are made to the existing gear box parts inside the gear box since external guide tubes or guide hoses are arranged inside the gear box housing in addition to the existing gear box parts. For example, an endoscope is guided to mechanically stressed roller bearings in the gear box or respectively planetary gear box through the empty tube or, respectively, guide tube. Moreover, it is possible to inspect toothing areas of shafts or pinions or other mechanically highly stressed areas within the gear box.

Moreover, it is advantageous in one embodiment if the guiding means, e.g. guide tube and/or guide hose, is arranged inside the gear box housing at least in sections at or on fixed components of the gear box and/or at least the guiding means is arranged inside the gear box housing at least in sections at or on components of the gear box moving or moveable, in particular rotating or rotatable, with respect to the gear box housing. It is hereby possible that sections of the guiding means or respectively guide tube sections are arranged both on non-moving as well as on moving components inside the gear box, for example via spacers or the like, on the components, wherein the guide tube sections, which are arranged on moving components, are brought into predetermined positions so that this guide tube section works together with other guide tube sections, which are arranged for example on non-moving components, so that several guide tube sections result in a total of one guide tube through which one work instrument is inserted.

Furthermore, it is advantageous in one embodiment if the guide tube is made up of several sections. Guide tube sections, which are mounted permanently to the housing, and other sections, which are arranged on components of the gear box movable, in particular rotating, with respect to the housing, are preferably provided inside the gear box. It is hereby possible to position guide tube sections with respect to each other through rotation of the components so that they work with each other and so that, in these predetermined positions, several guide tube sections result in a total of one guide tube, which is inserted into the work instrument.

The arrangement on rotating and non-rotating components can preferably take place via, or respectively by means of, spacers or the like.

Furthermore, guide tubes can be provided, the sections of which are arranged on several components rotating at different speeds, which thereby are brought into a predetermined position so that they work together and with an access opening in the gear box housing so that a work instrument can be inserted.

Moreover, it is possible within the scope of the invention that a guide tube, which is arranged on a movable component of the gear box, is brought into a corresponding insertion position or, respectively, work position for the guide tube with respect to the access opening so that an endoscope, for example, is inserted into the gear box housing via the guide tube or respectively the empty tube in this fixed insertion position of the guide tube.

Furthermore, it is advantageous in one embodiment that the guiding means has several guiding means sections, such as tube sections and/or hose sections, which communicate with each other and are aligned or alignable with respect to each other, especially upon insertion of a or the work instrument into the guiding means. The guidance and positionability of the work instrument within the gear box housing, for example in a planetary gear box, is hereby facilitated.

Moreover, the insertion process and the handling of the work instrument are improved by the guiding means, e.g. guide tube, that comprises straight and/or bent guide means sections or respectively guide tube sections so that the work instrument is positionable accordingly on predetermined areas or components of the gear box.

Moreover, it is beneficial in one embodiment if openings, for example in the form of small perforation holes or openings, are provided in the guide tube or respectively guide hose so that gear box oil escapes from the guide tube or respectively the guide tube section for example during insertion of a work tool into the empty tube or respectively guide tube in order to not contaminate the work instrument and to keep it fully functional. During the insertion process, oil accordingly escapes from the openings or perforation openings in the guide tube wherein the work instrument is held within the inner wall of the guide tube. Pressure balance is achieved in a simple manner through the openings or respectively perforation holes when the guide tube section is arranged for example in an oil sump or the like.

Furthermore, it is particularly advantageous when the guiding means, in particular guide tube and/or guide hose, comprises an oil scraper device in particular on the end or at the outlet of the guide means inside or respectively in the gear box housing so that for example the optics of an endoscope as work instrument is freed. For example, the oil scraper device can thereby be designed with a sealing lip or rubber lip.

The object is also solved or respectively a further embodiment of the gear box is characterized in that at least one optical device, in particular a mirror or prism or the like, is arranged in the gear box housing or in that part of an optical device, in particular an endoscope, is arranged, in particular permanently in the gear box housing, wherein the interior of the gear box housing, in particular components of the gear box, are checked or are checkable using the optical device and using a work instrument inserted or provided in the gear box housing, in particular via a guide tube or empty tube or a guide hose or physical properties of media in the gear box, e.g. gear box oil or the like, or physical properties of components of the gear box are detected or are detectable. Due to the fact that mirrors or other optical devices are provided at predetermined positions inside the gear box housing, by means of which areas that are difficult to access for a work instrument, for example an endoscope, which is inserted into a guide tube arranged in the gear box housing for example through insertion, become visible, other areas of components relevant for the inspection or for maintenance measures also become visible using a work instrument.

Within the scope of the invention, it is possible that one or more components of an endoscope, e.g. the optics of an endoscope, are permanently arranged, i.e. permanently installed, in the gear box housing as the optical device and are also present or respectively remain in the gear box housing during operation of the gear box. In one embodiment, the provided guiding means is thereby used as holding devices or holders for the optical unit of an endoscope. For example, a part of an endoscope permanently arranged in the gear box is furthermore designed as a light conductor or light source.

In particular, for example in the area of the outlet side of the guiding means or respectively of the guide tubes, corresponding mirrors are arranged so that a rear area of a component, for example a planet carrier or the like, can be inspected in a quite simple manner through the deviation mirrors using the endoscope in the area of the deviation mirror(s). The optical devices, or respectively mirrors, can thereby be arranged on fixed and/or also on moving, i.e. rotatable or rotating, components, wherein no structural measures will be or respectively are performed on the components through the arrangement of the optical device or respectively mirrors.

Moreover, the gear box in a further embodiment is characterized in that the access opening, in particular for one or more separate guide means or respectively guide tubes, is constructed to be closable. For example, a cover or a closure can be provided for this in order to close the access opening so that, for example, no oil escapes from the gear box and no dirt penetrates the closed access opening while the gear box is running.

Furthermore, the object is also solved through a wind power plant with a gear box, which is designed as described above. In order to avoid repetitions, reference is made expressly to the above explanations.

Furthermore, the object is solved through the use of a work instrument in a gear box housing of a gear box, in particular planetary gear box, of a wind power plant, wherein at least one guiding means or guide tube is provided for the work instrument inside the gear box or respectively inside the gear box housing, wherein the gear box is designed as described in detail above We also expressly refer to the above explanations in order to avoid repetitions.

Furthermore, it is advantageous in one embodiment if the work instrument is designed as an inspection device, in particular an endoscope, and/or as a measurement device, in particular a sensor, more preferably as an infrared sensor or the like, and/or as a tool, in particular a processing tool, in order to perform corresponding measures or maintenance work inside the gear box at the predetermined locations.

Depending on the alignment and design or respectively arrangement of the guiding means inside the gear box, rigid or flexible endoscopes can be used within the scope of the invention. The endoscopes provided for this thereby transfer the image information from the inside of the gear box to a screen or the like and/or save the captured image data as individual images, images series or videos on a data medium.

Furthermore, it is possible in a further embodiment to use the guiding means as holders or as a holding device for optics permanently installed or arranged inside the gear box as the optical device of an endoscope. In the case of this type of design, for example a light conductor of an endoscope and/or a light source of an endoscope are installed or respectively arranged inside the gear box as the optical unit and remain there. In the case of maintenance of the gear box using an endoscope designed inside the gear box, further components of the endoscope are connected with the optics or respectively optical device or unit of the endoscope already installed inside the gear box in order to provide a complete endoscope for use, which is made up of the removable components and the optics or respectively optical device working together with the components.

Further characteristics of the invention will become apparent from the description of the embodiments according to the invention together with the claims and the included drawings. Embodiments according to the invention can fulfill individual characteristics or a combination of several characteristics.

BRIEF DESCRIPTION OF THE DRAWINGS

The invention is described below in an exemplary manner, without restricting the general intent of the invention, based on exemplary embodiments in reference to the drawings, whereby we expressly refer to the schematic drawings with regard to the disclosure of all details according to the invention that are not explained in greater detail in the text. The drawings show in.

DETAILED DESCRIPTION OF THE INVENTION

In the following figures, the same or similar types of elements or respectively corresponding parts are provided with the same reference numbers in order to prevent the item from needing to be reintroduced.

Figure 1:
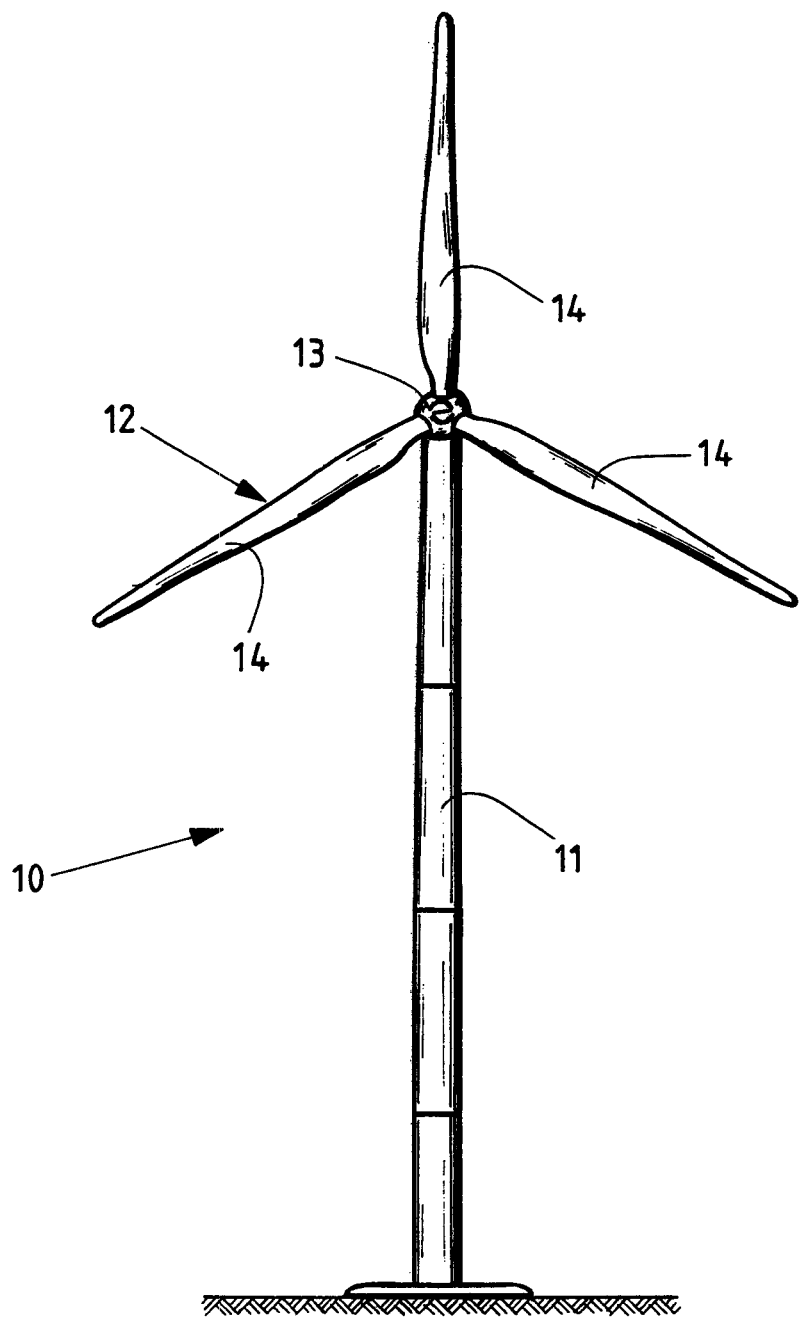
FIG. 1 a schematic representation of a wind power plant.

FIG. 1 shows a schematic representation of a wind power plant 10. The wind power plant 10 has a tower 11 and a rotor 12, which comprises three rotor blades 14, which are attached to a rotor hub 13. When there is wind, the rotor 12 turns in the known manner. Power from a generator connected to the rotor 12 or respectively to the rotor hub 13 can hereby be generated in a machine cabin (see FIG. 2) arranged on the tower 11 and behind the rotor 12 and is supplied to a consumer network.

Figure 2:
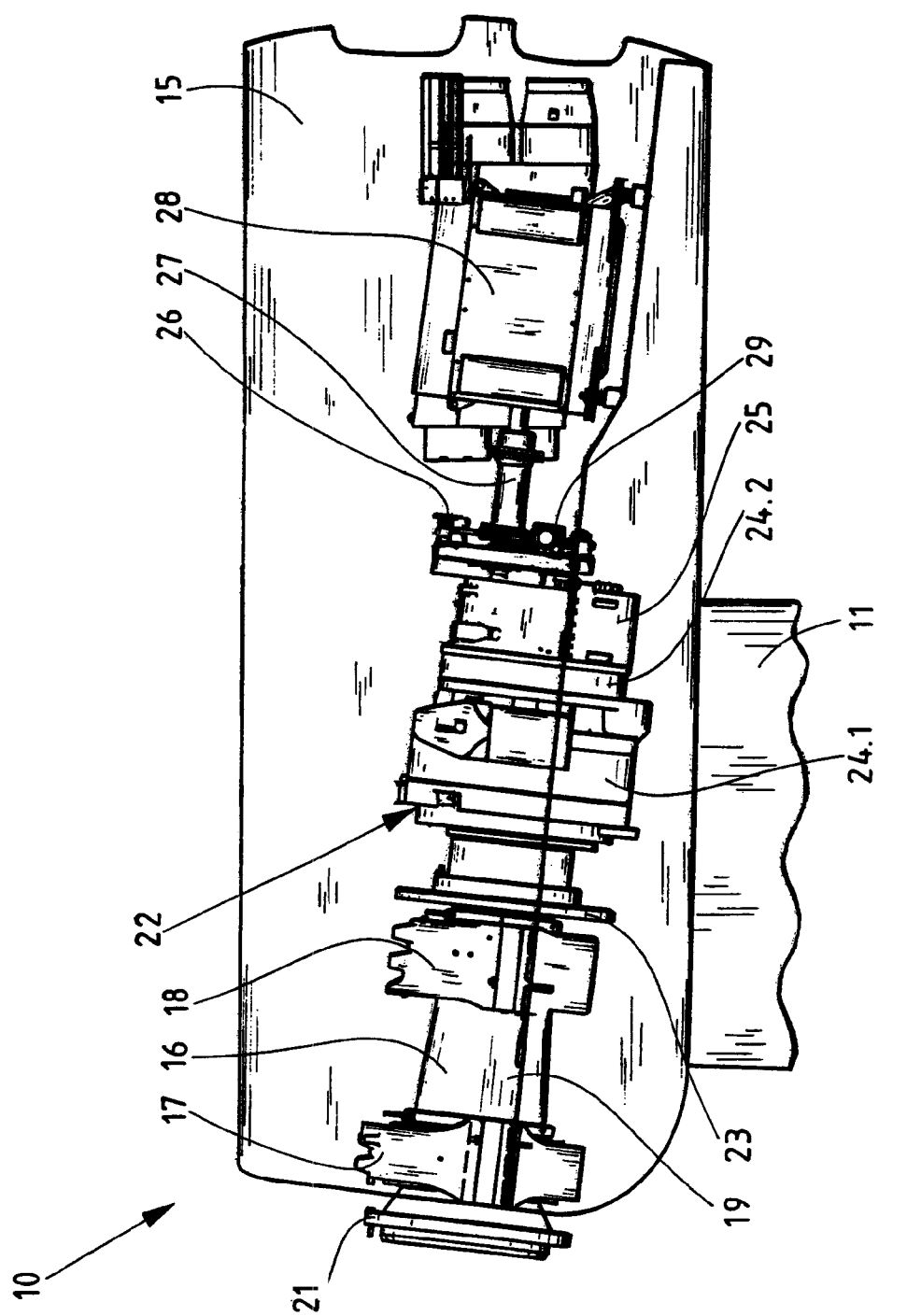
FIG. 2 a schematic cross-sectional view of a nacelle of a wind power plant.

FIG. 2 shows a schematic cross-sectional view of a machine cabin 15 or respectively a nacelle arranged on the tower 11 of the wind power plant 10. In the rotor-side area of the machine cabin 15, a rotor shaft 16 is mounted in two bearing supports 17, 18 on a slightly tilted machine frame 19. The rotor shaft 16 projects towards the rotor side out of the machine cabin 15 and has a rotor flange 21 on the outside, on which the rotor 12 or respectively the rotor hub 13 of a rotor is fastened (see FIG. 1).

The side of the rotor shaft 16 facing away from the rotor 12 is connected with a multi-stage gear box 22 in the machine cabin 15, wherein a locking device 23 is provided between the bearing bracket 18 and the inlet side of the gear box 22 so that the rotor 12 can be or is locked during the standstill for maintenance work on the wind power plant 10.

The multi-stage gear box 22 consists of two planetary stages 24.1, 24.2 arranged behind each other, which are in mechanical operative connection with each other. Moreover, the second planetary gear box stage 24.2 is in operative connection with a rear spur wheel stage 25 of the gear box 22.

Through the multi-stage gear box 22, the low rotational speed of the rotor shaft 16 over several stages is converted into a high speed of an output shaft, which drives a generator 28 via a coupling 27. Within the scope of the invention, it is possible that the multi-stage gear box 22 can also have a planetary stage and two spur wheel stages or any another combinations of stages.

A rotor brake 26 as well as the coupling or respectively generator coupling 27 are arranged on the generator-side or respectively the side of a drive shaft of the spur wheel stage 25 facing away from the rotor. The coupling 27 is thereby connected with the generator shaft. A slip ring unit 29 for the blade adjustment of the rotor blades 14 (FIG. 1) is arranged below the rotor brake 26. The slip ring unit 29 forms the power supply device for the rotor hub 13 (FIG. 1) together with a cable tube running through the gear box 22 into the rotor shaft 26.

Figure 3:
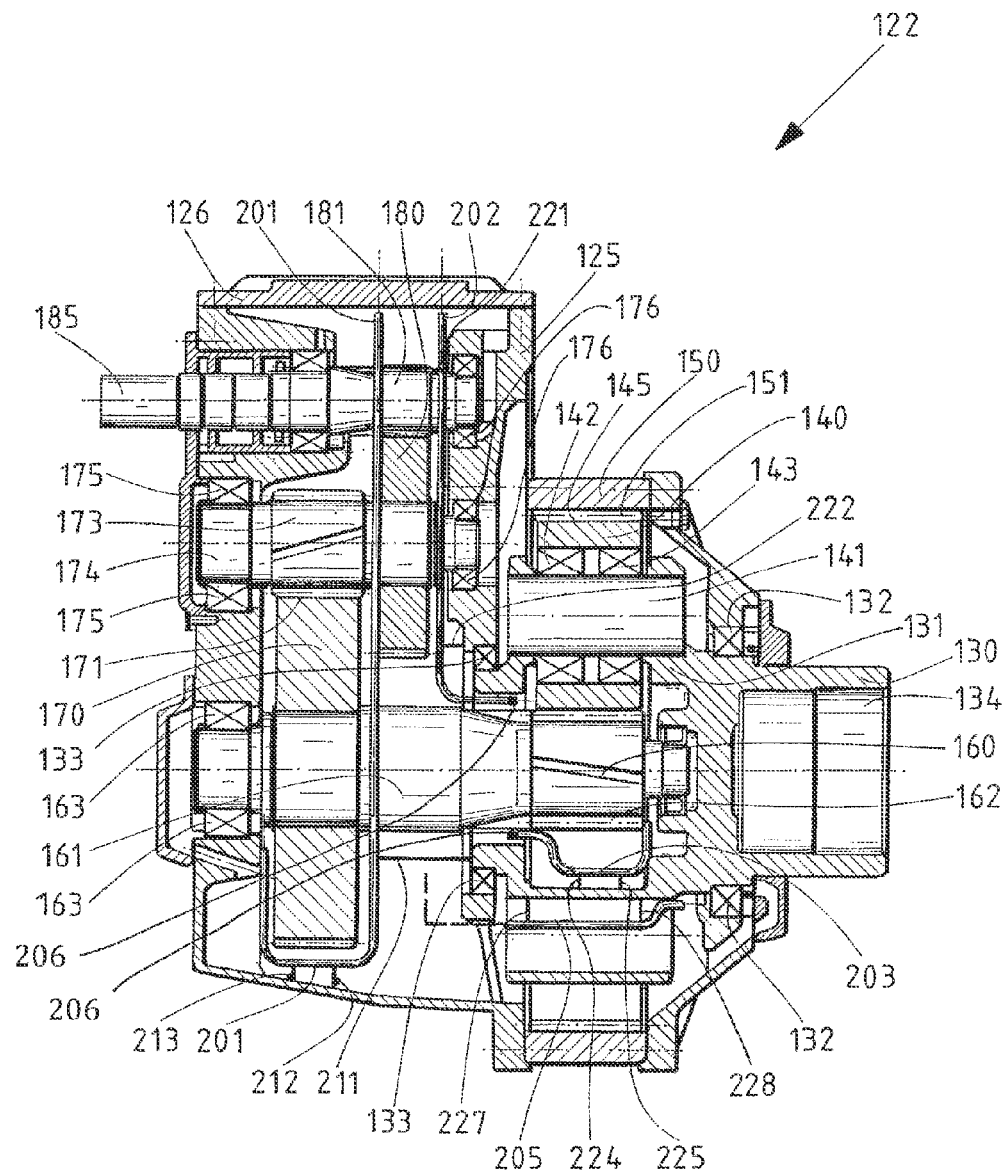
FIG. 3 a schematic cross-section of a gear box or respectively planetary gear box of a wind power plant according to the invention.

A schematic cross-section through a three-stage gear box 122 of a wind power plant is shown in FIG. 3, wherein the gear box 122 has a planetary stage as the first gear box stage and two spur wheel stages as the second and third gear box stages. The gear box 122 has a housing 125, in which the three gear box stages are arranged.

A shaft end for receiving the rotor shaft or respectively a planet carrier shaft 130 with a planet carrier 131 is arranged towards the rotor side or respectively towards the rotor-shaft side, wherein the planet carrier 131 is mounted in a rotatable manner inside the gear box by means of a front bearing 132 and a rear bearing 133. The planet carrier shaft 130 has a collet 134 towards the rotor shaft, which is connected with the rotor shaft.

Several planet gears 140 are arranged on the planet carrier 131, wherein a cross-section of a planet gear 140 is shown in FIG. 3 only for reasons of presentability. The planet gear 140 is arranged above a planetary bolt 141 arranged between the planet carrier 131 and the planet gear 140, wherein two bearings 142, 143 are arranged between the planetary bolts 141 and the planet gear 140 surrounding it so that the planet gear 140 is mounted in a rotatable manner around the planetary bolt 141.

The planet gear 140 has a toothing 145 on its outside, which engages in a toothing 151 of a hollow wheel 150 surrounding the planet gears 140. The fixed hollow wheel 150 has the toothing 151 on the inside so that, through rotation of the planet carrier 131, the planet gears 140 arranged on it also rotate and the gear teeth 145 of the planet gears 140 engage in the toothing 151 of the housing-fixed hollow wheel 150.

A sun wheel 160, which is arranged on the sun wheel shaft 161, is arranged in the inside area of the planet carrier 140. The sun wheel 160 has a toothing 162 on its outside, which engages in the toothing 145 of the planet gears 140. Under rotation of the planet carrier 130, the sun wheel 160 is driven in a rotating manner by means of the rotating planet gears.

On the end of the sun shaft 161 facing away from the sun wheel 160, a spur wheel 170 with an external toothing 171 is arranged on the sun wheel 161. The sun shaft 161 is mounted in a rotatable manner on the outer end by means of a bearing 163.

The toothing 171 of the spur wheel 170 is in contact with a pinion 173, which is arranged or respectively designed on an intermediate shaft 174. The intermediate shaft 174 is mounted in a rotatable manner by means of two exterior bearings 175, 176.

Furthermore, a spur wheel 180 is arranged on the intermediate shaft 174, which is designed with its exterior toothing in a pinion 181 on a rotatable output shaft 185. The output shaft 185 is connected on the output side with the generator of the wind power plant.

Moreover, according to the invention, several empty tubes 201, 202 are arranged inside the housing 125, into which work instruments, such as an endoscope, are inserted into the empty tubes 201, 202 from outside or respectively, externally after removal of an inspection cover 126 on the top side of the gear box or respectively of the gear box housing 125.

The empty tube 201 is arranged fixed inside the gear box 122 by means of holders 211, 212, 213. The empty tube 201 comprises straight tube sections and bent tube sections so that the empty tube 201 is designed in a J-shaped or respectively U-shaped manner inside the gear box, whereby the area of the sun wheel shaft 161 between the spur wheel 170 and the bearing 163 of the sun wheel shaft 161 can be examined after insertion of an endoscope into the empty tube 201. Through use of the empty tube 201, the inspection work can be carried out without the dismantling of further inspection covers or bearing covers of the gear box 122 or respectively of the gear box housing 125 since the relocation or respectively arrangement of the empty tube 201 takes place from a central location, e.g. on the top side of the gear box 122. The time for the inspection or respectively the positioning of an inspection tool at the corresponding location is thereby shortened due to the exact guidance of an inserted endoscope in the empty tube 201, wherein dirt entry into the gear box is also minimized.

The second empty tube 202 is also fastened in a fixed manner via holders 221, 222 on the inner wall of the housing, wherein the toothing area between the planetary stages 140 and the sun wheel 160 can be examined by means of an endoscope inserted into the empty tube 202.

Moreover, it is shown in FIG. 3 that, also on a rotating component, such as the planet carrier 130, an empty tube section 203 is arranged by means of second holders 224, 225, wherein under rotation of the planet carrier 130, the inlet opening of the empty tube 203 can be brought into congruence with the lower outlet opening of the empty tube 202 so that the area behind the sun wheel 160 between the sun wheel and the planet carrier 131 can be inspected through insertion of an endoscope via the empty tube 202 and the empty tube section 203 communicating with it in the working position, if it is positioned in congruence.

Moreover, another empty tube 205 is arranged on the planet carrier 131 by means of two spacers 227, 228, so that the bearing 132 can be examined through insertion of an endoscope into the empty tube 205. The empty tube 205 has an empty tube section, which projects out of the plane of projection, so that further sections of the empty tube 205 are only indicated by dashed lines in it.

Due to the fact that empty tubes are also fastened or respectively arranged on rotating components of the gear box, areas that are difficult to access within the gear box 122 are also examinable in a defined position or respectively work position through fixed empty tubes. Thus, locations in the gear box are also reached, which would be inaccessible or very difficult to access due to undercuts with fixed empty tubes.

Moreover, within the scope of the invention, it is possible that, for example, mirrors or the like are arranged at the exits of the empty tube on the outlet side so that visibility into further heavily mechanically stressed and hard-to-access areas inside the housing is also enabled using an endoscope as the work instrument and mirrors.

The empty tubes 202, 203, 204 and 205 inside the gear box 125 are designed such that areas that are hard to access within the gear box are quickly accessible for inspection through simple insertion of an endoscope as the work instrument into the empty tubes. Further, the guiding means 201, 202, 203, 204, 205 can include an oil scraper device 206 on the end or at the outlet of the guiding means 201, 202, 203, 204, 205.

All named characteristics, including those taken from the drawings alone, and individual characteristics, which are disclosed in combination with other characteristics, are considered alone and in combination as important to the invention. Embodiments according to the invention can be fulfilled through individual characteristics or a combination of several characteristics.

LIST OF REFERENCE NUMBERS

10 Wind power plant
11 Tower
12 Rotor
13 Rotor hub
14 Rotor blades
15 machine cabin
16 Rotor shaft
17 Bearing support
18 Bearing support 19 Machine frame
21 Rotor flange
22 Multi-stage gear box
23 Locking device
24.1 First planetary stage
24.2 Second planetary stage
25 Spur wheel stage
26 Rotor brake
27 Coupling
28 Generator
29 Slip ring unit
122 Gear box
125 Housing
126 Inspection cover
130 Planet carrier shaft
131 Planet carrier
132 Bearing
133 Bearing
134 Collet
140 Planet gear
141 Planetary bolts
142 Bearing
143 Bearing
145 Toothing
150 Hollow wheel
151 Toothing
160 Sun wheel
161 Sun wheel shaft
162 Toothing
163 Bearing
170 Spur wheel
171 Toothing
173 Pinion
174 Intermediate shaft
175 Bearing
176 Bearing
180 Spur wheel
181 Pinion
185 Output shaft
201 Empty tube
202 Empty tube
203 Empty tube
205 Empty tube
206 Oil scraper device
211 Holder
212 Holder
213 Holder
221 Holder
222 Holder
224 Holder
225 Holder
227 Holder
228 Holder

The invention claimed is:

1. A multi-stage gear box (122) of a wind power plant, the gear box (122) comprising:
a gear box housing (125),
wherein at least one access opening for the insertion of a work instrument into the gear box housing (125), is provided on the outside of the gear box housing (125) at least one guiding means (201, 202, 203, 204, 205) is provided for the work instrument inside the gear box housing (125) so that the work instrument is moveable and/or positionable within the guiding means (201, 202, 203, 204, 205),
wherein parts of the gear box (122) in the gear box housing (125) are checked and/or worked by means of the work instrument inserted or arranged or arrangeable in the guiding means (201, 202, 203, 204, 205) or at least one physical property of oil, in the gear box housing (125) or physical properties of components of the gear box (122) are detected, wherein the components include at least one fixed component that is not movable with respect to the gear box housing and at least one moveable component that is moveable with respect to the gear box housing,
wherein the guiding means (201, 202, 203, 204, 205) includes several guiding means sections that communicate with each other and are aligned or alignable with each other, upon insertion of the work instrument into the guiding means, and
wherein the guiding means sections include at least one fixed section that is attached to the at least one fixed component and at least one moveable section that is attached to the at least one moveable component.

2. The gear box (122) according to claim 1, wherein the guiding means (201, 202, 203, 204, 205) is constructed as a guide tube (201, 202, 203, 204, 205) or as a guide hose.

3. The gear box (122) according to claim 1, wherein the guiding means (201, 202, 203, 204, 205) is constructed closed in sections in cross-section.

4. The gear box (122) according to claim 1, wherein the guiding means (201, 202, 203, 204, 205) comprises straight or bent tube sections.

5. The gear box (122) according to claim 1, wherein openings are provided in the guiding means (201, 202, 203, 204, 205).

6. The gear box (122) according to claim 1, wherein the guiding means comprises an oil scraper device on an end or at an outlet of the guiding means (201, 202, 203, 204, 205).

7. The gear box (122) according to claim 1, wherein at least one optical device is arranged in the gear box housing (125) or a part of the optical device is arranged in the gear box housing (125), wherein the interior of the gear box housing (125) is checked or is checkable using the optical device and using the work instrument inserted or provided in the gear box housing (125) or physical properties of media in the gear box or the physical properties of the components of the gear box (122) are detected or are detectable.

8. The gear box (122) according to claim 1, wherein the access opening for one or more guiding means, is constructed to be closable.

9. The gear box (122) according to claim 1, wherein the work instrument is disposed in the gear box housing (125).

10. The gear box (122) according to claim 9, wherein the work instrument is at least one of an inspection device, a measurement device, and a tool.

* * * * *